May 22, 1934.  K. KÜHNE  1,959,537
INSTRUMENT FOR DETERMINING THE DIAMETER OF BODIES WITH CURVED SURFACES
Filed Aug. 8, 1931
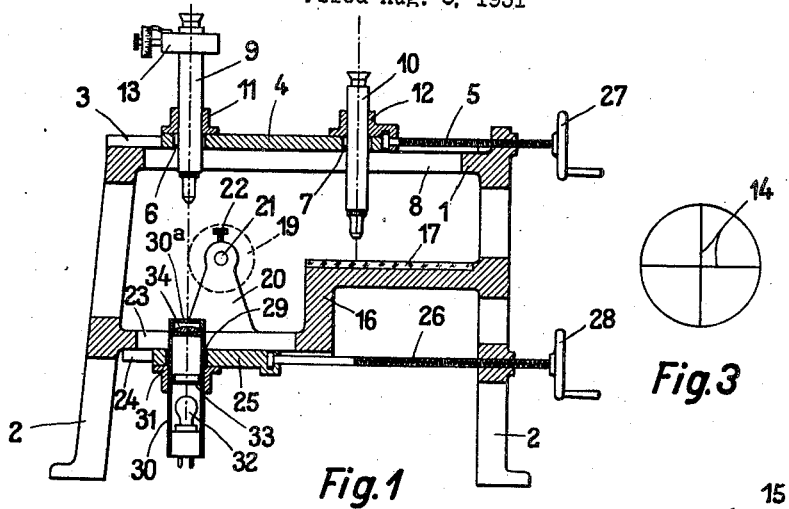
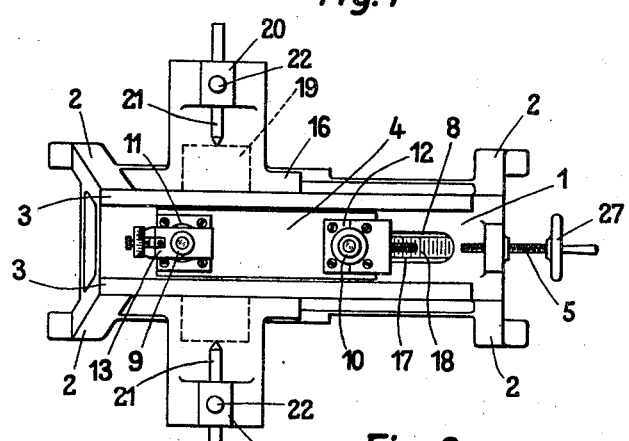
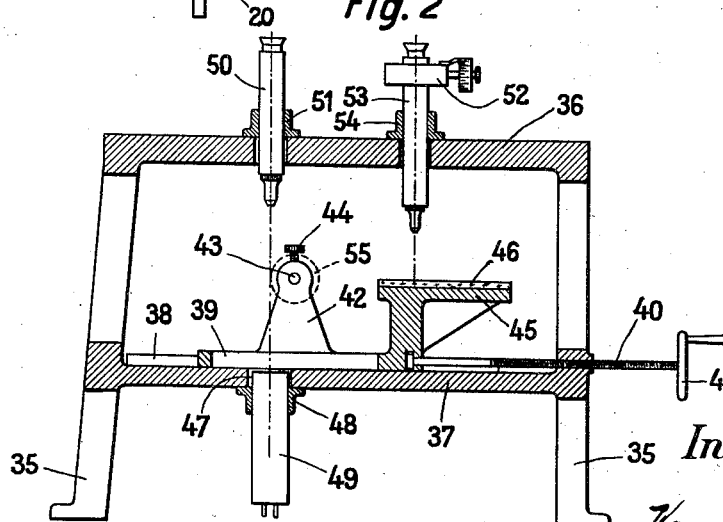
Inventor:
Konrad Kühne Patented May 22, 1934

1,959,537

UNITED STATES PATENT OFFICE 1,959,537

INSTRUMENT FOR DETERMINING THE DIAMETER OF BODIES WITH CURVED SURFACES

Konrad Kühne, Jena, Germany, assignor to firm: Carl Zeiss, Jena, Germany

Application August 8, 1931, Serial No. 555,929
In Germany August 18, 1930

5 Claims. (Cl. 88—14)

Application has been filed in Germany, August 18, 1930.

With a view to exactly determine the diameter of a body having a curved surface, this body is in most cases illuminated on one side and the breadth of the shadow cast by this body is measured by means of a fine measuring instrument. Adjusting a measuring instrument according to the limits of the shadow being rather problematic, this method will not satisfy high demands of accuracy. For this reason rulers with sharp measuring edges are laid against the body and the distance either of the fine light slits arising between the rulers and the body or of two parallel lines provided on the rulers at definite distances from the measuring edges is measured. This proceeding requires much skill in the application of the measuring edges, which is acquired only after a long period of practice. The measuring edges are soon worn by continuous use which makes them lose their sharpness and thus entails the disadvantage that the distance between the straight lines parallel to these measuring edges is altered.

The new instrument may be suitably used for carrying out a comparatively accurate determination of the diameter of any body with curved surface. The purpose of the instrument is to tangentially illuminate the surface of the body, at one end of the diameter to be measured, and this by means of a light pencil which has an aperture ratio not exceeding, and preferably being considerably inferior to 1:20. In this manner there is produced a system of interference stripes, another system of interference stripes being obtained by means of a light pencil which is parallel to the first mentioned one and also has a small angle of aperture. This other system appears on the surface of the body, at the other end of the diameter to be measured. The distance of one of the interference stripes of the one system from one of the interference stripes of the other system is measured by means of a fine measuring device, and the measured value is reduced by the sum of the calculated distances of the interference stripes used for measuring from the surface. The interference phenomena in the measuring plane are caused by the fact that light rays which just pass the body without striking it interfere with such light rays which have struck the body and have been reflected by the surface of the same before they reached the measuring plane. The interference stripes have the known black deletion stripes which are suitably used for measuring and whose distance from the surface of the body can be calculated from the wave-length of the light and from the radius of curvature at the spot to be measured.

The bodies to be measured generally may have any cross-sectional form; the radii of curvature of the surfaces at the ends of the measured diameter may be of different lengths. However, in the majority of cases these radii of curvature will be equal in length. This applies for instance when the diameter of a body of revolution or of the flanks of a thread is to be measured. In these cases the instrument is used for measuring in the two systems the distance of two interference stripes of the same order which are at equal distances from the surface of the body. The measured value is to be reduced by twice the calculated distance of one of these stripes from the surface of the body. When measurements of the diameters of bodies of revolution are to be effected, the instrument is to be provided with a linear measuring mark which is given a position parallel to the axis of revolution of the body. However, when the flank diameters of the threads are to be measured and in case it is not desired to use a linear mark adjustable according to the inclination of the thread flanks, it is advisable to apply a mark which determines one point in the field of view.

The measurement by means of the new instrument is especially simplified when those interference stripes of the two systems upon which the measurement is to be based are subsequently produced at the same spot by means of rays of the same light pencil which tangentially pass the body. For this purpose, the instrument may be so constructed as to displace the body in the direction of the diameter to be measured relatively to the light pencil. The value of this displacement is taken as a basis for the calculation of the diameter.

The new instrument is provided with a support for the body to be measured, with an illumination device, and with a microscope having a measuring mark which is displaceable in one direction relatively to the said support. Instruments of this kind are already known. They are provided either with a displaceable microscope having a measuring mark which generally designates the optical axis, or with a fixed microscope having a displaceable measuring mark, or, finally, with a microscope which, while being displaceable for coarse measurement, has a measuring mark that is also displaceable and serves for the fine measurement. Reversely, also the support can be displaceable relatively to the fixed microscope. A measurement can be effected only when these instruments are provided with a microscope of a comparatively strong magnification which, for instance, is at least forty-fold, and with an illumination device emitting a light pencil which has a comparatively small angle of aperture and whose direction is approximately parallel to the axis of the microscope and which, relatively to the bearing, intersects approximately at right angles the direction of displacement of the measuring mark.

The emitted light pencil can be produced in the known manner by means of a collimator having in the focal plane of a converging lens a diaphragm illuminated from one side. The pencil would have parallel rays if the illuminated diaphragm aperture which serves as a light source in a narrower sense were restricted only to the focus of the lens. However, this being impossible in practice, at least the diaphragm aperture will be given the shape of a very small circular surface or of a narrow slit, so that, in order to provide interference stripes that are distinctly visible and sharply limited, the aperture of the light pencil emitted by the collimator is given at least in the longitudinal section in question a sufficiently small value. Contrary thereto, the interference phenomena would become more or less indistinct and would finally disappear completely if the light pencil were given a greater aperture, which is due to differently directed illumination rays striking the illuminated points of the surface of the body.

The annexed drawing illustrates the invention in two constructional examples of an instrument for the method according to the invention. Figures 1 and 2 show the instrument in a central section in front elevation and in a cross section, respectively. Figures 3 and 4 show the two marks provided in the field of view of the two measuring microscopes, and Figure 5 shows another constructional form of the instrument in a central section in front elevation.

The instrument (Figures 1 and 2) has a table 1 which rests on four feet 2 and is provided with a slide guide 3 on which a slide 4 is displaceable by means of a spindle 5. The slide 4 has two holes 6 and 7 and the table 1 has a longitudinal slit 8. In the slide 4 two measuring microscopes 9 and 10 are fixed by means of sockets 11 and 12, respectively, in such a manner that they extend through the holes 6 and 7 and the slit 8 downwardly and that their axes are at right angles to the direction of displacement of the slide 4. The measuring microscope 9 magnifies sixty times and is provided with an eyepiece screw micrometer 13 in the field of view of which a reticule 14 is displaceable in the known manner. In the field of view of the microscope 10 is provided a fixed double thread 15.

The four feet 2 are connected by means of a stepped supporting plate 16. The higher part of this stepped plate 16 is provided with a glass scale 17 having a division 18. The lower part of the plate 16 is broadened on both sides and provided with two supports 20 in which, for the purpose of holding the objects to be measured, for instance the cylinder 19 represented by dash lines, two pointed bolts 21 are clamped by means of screws 22. The axis of these bolts 21, which is represented by the line connecting their pointed ends, is at right angles to the direction of displacement of the slide 4 and to the axis of the microscope 9. In the lower part of the plate 16 is provided a slit 23 which is parallel to the slit 8.

The lower side of this lower part of the plate 16 carries a slide guide 24 on which, by means of a spindle 26, a slide 25 is displaceable in a direction parallel to the direction of displacement of the slide 4. The spindles 5 and 26 are provided with hand wheels 27 and 28, respectively.

The slide 25 has a hole 29 for the tube 30 of a collimator. The collimator is fixed to the slide 25 by means of a socket 31 in such a manner that its axis is parallel to that of the microscope 9. Inside the tube 30 is provided a glow lamp 32 and a diaphragm 33 having a fine slit. This slit is parallel to the line connecting the pointed ends of the two bolts 21 and goes through the focus of a converging lens 34. The light exit aperture of the collimator tube 30 is covered by a diaphragm 30a having a fine slit parallel to the slit of the diaphragm 33.

When using the instrument the glow lamp is to be lighted by connecting it to the main. Thereupon, at least in the planes in question, which are parallel to the plane in which Figure 1 appears in the drawing, the collimator emits towards above a very slightly apertured light pencil the rays of which are parallel with great approximation. By turning the hand wheel 28 the collimator has to be adjusted in such a manner that the emitted light pencil passes tangentially one side of the cylinder 19. The microscope 9 is to be so adjusted that it sharply images a horizontal plane through the ends of the bolts 21. Further, by means of the hand wheel 27, the microscope is to be displaced so far until the illuminated edge of the cylinder 19 is visible in the central part of the field of view of the microscope 9. The measuring microscope 10 is to be so adjusted that the division 18 is sharply imaged, and by means of the spindle 5 the slide 4 is displaced another time until the microscopic image of that division line of the said division 18 which is next to the double thread 15 lies exactly between these two threads.

In the microscope 9 there is now visible a system of interference stripes which is parallel to the illuminated edge of the cylinder 19. The reticule 14 of the eyepiece micrometer 13 is adjusted to one of the stripes by turning the micrometer screw and the values adjusted are read on the division 18 and in the eyepiece micrometer 13. Thereupon the just described adjustment of the two slides 4 and 25 and of the reticule 14 is repeated on the other side of the cylinder, preferably for the corresponding interference stripe, and the obtained values are read on the division 18 and in the eyepiece micrometer 13. The difference between the two readings furnishes the distance of the two interference stripes on either side of the cylinder 19. In order to find the diameter of the cylinder 19 this difference is to be reduced by the sum of the distances of the interference stripes from the surface of the cylinder 19 or, when using the corresponding stripes on both sides, by the double value of the distance of one of these stripes. This last mentioned value can be obtained by calculation.

The above described instrument may be given manifold constructional alterations. For instance one hand wheel will do for displacing both slides 4 and 25 when the two spindles 5 and 26 are provided with equal threads and coupled to each other. If bodies of comparatively small diameters are to be measured, the collimator may be fixedly arranged on the supporting plate 16 when care is taken that the light pencil it emits has in the respective plane a diameter greater than the greatest diameter to be measured. In this case the light pencil may be allowed to go through the diaphragm in two partial pencils which tangentially pass both sides of the body to be measured. Measuring the flank diameters of threads is effected in the same manner as is described with reference to a cylindrical body. Although in this case the interference stripes are no longer parallel to the line connecting the points 21, the method is quite the same. When the diameters of irregularly shaped bodies are to be determined, the bodies can be placed on the lower part of the plate 16, in which case the collimator must not protrude over this surface and the diameter to be determined must be exactly parallel to the direction of displacement of the slide 4, or, in other words, horizontal.

According to the second constructional form (Fig. 5) the instrument has a table 36 resting on four feet 35. The feet 35 are connected by an intermediate plate 37 provided with a slide guide 38 on which a slide 39 is displaceable by means of a spindle 40 and a handwheel 41. The slide 39 carries two supports 42 in which pointed bolts 43 are clamped by means of screws 44, and an angular piece having the form of a small table 45 on which a glass scale 46 is fixed. Below the slide 39, in a hole 47 in the intermediate plate 37, a collimator 49 is fixed by means of a socket 48 which equals the collimator 30, 32, 33, 34 belonging to the first constructional form of the instrument. Above this collimator 49 is fixed by means of a socket 51 a microscope 50 magnifying 60 times and above the glass scale 46, by means of a socket 54 in the table 36, a microscope 53 with an eyepiece screw micrometer 52. The microscope 50 is also provided with a reticule 14 (Fig. 3) and the eyepiece screw micrometer 52 with a double thread 15 (Fig. 4).

When using the instrument (Fig. 5) the body to be measured, 55, is fixed between the pointed ends of the bolts 43 and, the collimator 49 being connected to the main, the slide 39 is displaced by means of the hand wheel 41 and the spindle 40 so long until in the microscope 50, which is focused to the horizontal plane through the points 43, the interference stripes are visible on one side of the body 55. By going on with turning the hand wheel 41 the reticule 14 is adjusted in the microscope 50 to one of the interference stripes and the double thread 15 in the eyepiece screw micrometer 52 is displaced so far until that division line of the glass scale 46 which is next to the double thread 15 lies exactly between these threads. This adjustment having been made, the position of the interference stripe used in measuring is exactly determined and the adjustment is repeated for the corresponding interference stripe on the opposite side of the body 55. From the values of the two adjustments which are read on the scale division and in the eyepiece screw micrometer the distance which the two interference stripes have from each other is coarsely and exactly determined and the value thus obtained reduced in the same manner as is described with reference to the first constructional form of the instrument (Figures 1 and 2), is the length of the diameter.

The measurement can as well be carried into effect when, in quite the same manner as described with reference to the first constructional form, the eyepiece screw micrometer 52 is attached to the microscope 50 so that, as a consequence, the reticule 14 is displaceable and the double thread 15 fixed. For instance, instead of the eyepiece micrometer 52 and the double thread 15 the microscope 53 may be provided with a vernier division corresponding to the division on the glass scale 46. Finally, it is also possible to dispose the scale 46 fixedly, not displaceably on the scale 39, in which case the reading microscope 53 and the slide 39 must be displaceable.

I claim:

1. An instrument for determining the diameter of bodies with curved surfaces, comprising a table, fixed to this table a support for the body to be measured, an illumination device provided on this table and being displaceable in the direction of the diameter to be measured, a microscope provided on the table and lying opposite the illumination device displaceable in the said direction, a measuring mark disposed in the microscope, the illumination device being adapted to emit a light pencil having a comparatively small aperture and whose axis is approximately parallel to that of the microscope and intersects approximately at right angles the direction of displacement of the measuring mark, and a division and an index coacting with each other whereof the one is fixed to the table and the other to the microscope.

2. An instrument for determining the diameter of bodies with curved surfaces, comprising a table, fixed to this table a support for the body to be measured, an illumination device provided on this table and being displaceable in the direction of the diameter to be measured, a microscope provided on the table and lying opposite the illumination device displaceable in the said direction, a measuring mark disposed in the microscope, the illumination device being adapted to emit a light pencil having a comparatively small aperture and whose axis is approximately parallel to that of the microscope and intersects approximately at right angles the direction of displacement of the measuring mark, a division provided on the table and a reading device being connected to the first said microscope.

3. An instrument for determining the diameter of bodies with curved surfaces, comprising a table, fixed to this table a support for the body to be measured, this support being displaceable in the direction of the diameter to be measured, an illumination device fixed to the table, opposite the illumination device a microscope being fixed to the table, the illumination device being adapted to emit a light pencil having a comparatively small aperture and whose axis is approximately parallel to that of the microscope and intersects approximately at right angles the direction of displacement of the support, and a division and an index coacting with each other whereof the one is fixed to the table and the other to the support.

4. An instrument for determining the diameter of bodies with curved surfaces, comprising a table, fixed to this table a support for the body to be measured, this support being displaceable in the direction of the diameter to be measured, an illumination device fixed to the table, opposite the illumination device a microscope being fixed to the table, the illumination device being adapted to emit a light pencil having a comparatively small aperture and whose axis is approximately parallel to that of the microscope and intersects approximately at right angles the direction of displacement of the support, a division connected to the support and a reading microscope fixed to the table.

5. An instrument for determining the diameter of bodies with curved surfaces, comprising a support for the body to be measured, an illumination device, a microscope with a measuring mark, and a diaphragm disposed on the light exit aperture of the illumination device and restricting the aperture of the light ray pencil to a comparatively small beam, the measuring mark and the support being displaceable relatively to each other in the direction of the diameter to be measured, and the axis of the beam traversing the diaphragm being approximately parallel to that of the microscope and intersecting approximately at right angles the direction of displacement of the measuring mark.

KONRAD KUHNE.